US010112508B2

(12) United States Patent
Pleiman et al.

(10) Patent No.: US 10,112,508 B2
(45) Date of Patent: Oct. 30, 2018

(54) HARNESS BOOSTER CAR SEAT CONVERTIBLE TO MULTIPLE SEPARATELY USABLE CONFIGURATIONS

(71) Applicant: Evenflo Company, Inc., Miamisburg, OH (US)

(72) Inventors: Brian Ralph Pleiman, Centerville, OH (US); Alan Ball, Miamisburg, OH (US); Andrew R. Davis, Huber Heights, OH (US)

(73) Assignee: EVENFLO COMPANY, INC., Miamisburg, OH (US)

(*) Notice: Subject to any disclaimer, the term of this patent is extended or adjusted under 35 U.S.C. 154(b) by 179 days.

(21) Appl. No.: 15/229,939

(22) Filed: Aug. 5, 2016

(65) Prior Publication Data
US 2017/0057384 A1 Mar. 2, 2017

Related U.S. Application Data

(60) Provisional application No. 62/201,384, filed on Aug. 5, 2015.

(51) Int. Cl.
*A47C 1/08* (2006.01)
*B60N 2/28* (2006.01)
*B60N 3/10* (2006.01)

(52) U.S. Cl.
CPC ......... *B60N 2/2866* (2013.01); *B60N 2/2803* (2013.01); *B60N 2/286* (2013.01); *B60N 2/2812* (2013.01); *B60N 3/101* (2013.01)

(58) Field of Classification Search
CPC .. B60N 2/2866; B60N 2/2821; B60N 2/2803; B60N 2/26; B60N 2/28; B60N 2/2812; B60N 2002/684
USPC ....... 297/256.1, 250.1, 219.1, 254, 464, 353
See application file for complete search history.

(56) References Cited

U.S. PATENT DOCUMENTS

| 5,964,502 | A  | * | 10/1999 | Stephens | B60N 2/2812 |
|           |    |   |         |          | 297/250.1 |
| 6,196,629 | B1 | * | 3/2001 | Onishi | B60N 2/2806 |
|           |    |   |         |          | 297/256.12 |
| 6,478,377 | B2 | * | 11/2002 | Kassai | B60N 2/2839 |
|           |    |   |         |          | 297/256.1 |
| 7,021,710 | B2 | * | 4/2006 | Kain | B60N 2/2851 |
|           |    |   |         |          | 297/250.1 |
| 7,246,852 | B2 | * | 7/2007 | Balensiefer | B60N 2/2851 |
|           |    |   |         |          | 297/250.1 |
| 7,625,043 | B2 |   | 12/2009 | Hartenstine et al. | |
| 8,905,476 | B2 | * | 12/2014 | Davis | B60N 2/26 |
|           |    |   |         |          | 297/250.1 |
| 2001/0000638 | A1 | * | 5/2001 | Kassai | B60N 2/2806 |
|           |    |   |         |          | 297/250.1 |
| 2003/0151282 | A1 | * | 8/2003 | Williams | B60N 2/2851 |
|           |    |   |         |          | 297/250.1 |
| 2004/0124677 | A1 | * | 7/2004 | Meeker | B60N 2/2806 |
|           |    |   |         |          | 297/255 |
| 2007/0170759 | A1 | * | 7/2007 | Nolan | B60N 2/2851 |
|           |    |   |         |          | 297/250.1 |
| 2008/0111412 | A1 | * | 5/2008 | Woellert | B60N 2/2851 |
|           |    |   |         |          | 297/256.1 |

(Continued)

*Primary Examiner* — Chi Q Nguyen
(74) *Attorney, Agent, or Firm* — Baker & Hostetler LLP

(57) ABSTRACT

A harness booster car seat that is separable into a separately usable backless booster and a backrest booster that may or may not include a harness thereon.

6 Claims, 5 Drawing Sheets

(56) References Cited

U.S. PATENT DOCUMENTS

| | | | |
|---|---|---|---|
| 2008/0169692 A1* | 7/2008 | Clement | B60N 2/2851 |
| | | | 297/250.1 |
| 2012/0175922 A1* | 7/2012 | Gillett | B60N 2/2821 |
| | | | 297/188.01 |
| 2014/0125099 A1* | 5/2014 | Williams | B60N 2/2821 |
| | | | 297/250.1 |
| 2015/0097403 A1* | 4/2015 | London | B60N 2/2803 |
| | | | 297/250.1 |
| 2016/0207497 A1* | 7/2016 | Seal | B60R 22/105 |
| 2017/0282758 A1* | 10/2017 | Mitchell | B60N 2/2866 |
| 2017/0355284 A1* | 12/2017 | Hutchinson | B60N 2/2806 |

* cited by examiner

HARNESS BOOSTER CAR SEAT CONVERTIBLE TO MULTIPLE SEPARATELY USABLE CONFIGURATIONS

RELATED APPLICATIONS

This application claims priority from provisional application U.S. Application Ser. No. 62/201,384, filed on Aug. 5, 2015, entitled Harness Booster Car Seat Convertible to Multiple Separately Usable Configurations, the entire contents of which are expressly incorporated herein in their entirety by reference.

TECHNICAL FIELD

The present disclosure relates to child car seats, and more particularly to a consumer car seat that may be easily separated into at least two separately usable configurations.

BACKGROUND

The size and the type of car seat required for children changes as the child gets older and bigger. Further, it can often be desired to have multiple car seats that are combinable as a single usable unit but usable as multiple units. Accordingly, the present disclosure provides a child car seat that is usable as a single unit but may be disassembled by a consumer and used in multiple additional configurations.

There are many kinds of child car seats on the market that can be used in multiple configurations. U.S. Pat. No. 6,682,143 B2 discloses a conventional child car seat adapted to be used in an automobile. A larger-sized child can be secured on this conventional child car seat directly by the seat belt of the automobile.

U.S. Pat. No. 4,754,999 discloses another conventional child car seat that includes a base member and a seat assembly coupled on the base member and having a backrest.

U.S. Pat. No. 5,845,967 discloses still another conventional child car seat including a unitary shell having an upper backrest portion and a lower seat portion connected to each other by an integral hinge. The upper backrest portion can pivot relative to the lower seat portion to a position so that it is aligned with the lower seat portion to thereby facilitate storage and transport of this conventional child car seat.

U.S. Pat. No. 5,845,968 discloses yet another conventional child car seat including a seat member and a backrest member. The backrest member can be stowed within the seat member, thereby also facilitating packing and shipping of this conventional child car seat.

U.S. Pat. No. 6,623,074 discloses still another conventional child car seat provided with a vertically movable headrest on which the harness straps are mounted so that the position of the harness straps will be automatically changed when the headrest is moved.

U.S. Pat. No. 7,625,043 discloses another car seat having a booster seating portion that may be separated from the main portion of the seat. The main portion of the seat is pivotally attached to the base member.

However, despite these prior art child car seats, it is still desired to have a car seat that has some of the advantages of the above-mentioned conventional child car seats but includes improvements thereon. In particular, it would be desirable to have a car seat that is separable into a usable backless booster and a separate backrest booster that may or may not include a harness thereon. It is further desired to have a connection mechanism between such a backless booster portion and backrest/harness booster portion that slides into a single opening. It is also desired to have a harness booster that may be transitioned to a backless non-harness system in a single motion. Finally, it is desired to have a harness booster combination backless non-harness booster that doesn't require disassembly of the harness system to remove the booster from the backrest/harness portion.

SUMMARY

According to an embodiment of the present disclosure, a harness booster car seat is provided that is separable into a usable backless booster and a separate backrest booster that may or may not include a harness thereon. According to another aspect of the disclosure, a harness booster car seat is provided that includes a back portion that is slidingly connected to the backless booster portion of the car seat through a single opening. According to another embodiment of the disclosure, a harness booster seat is provided that may be transitioned to a backless non-harness system in a single motion. According to yet another aspect of the disclosure, a harness booster combination backless non-harness booster is provided that doesn't require disassembly of the harness system to remove the booster from the backrest/harness portion.

BRIEF DESCRIPTION OF THE DRAWINGS

The above-mentioned and other features of the disclosure may be clarified by reference to the following description taken in conjunction with the accompanying drawings, wherein.

Corresponding reference characters indicate corresponding parts throughout the several views. The exemplifications set out herein illustrate exemplary embodiments of the invention, and such exemplifications are not to be construed as limiting the scope of the invention in any manner.

DETAILED DESCRIPTION

Figure 1:
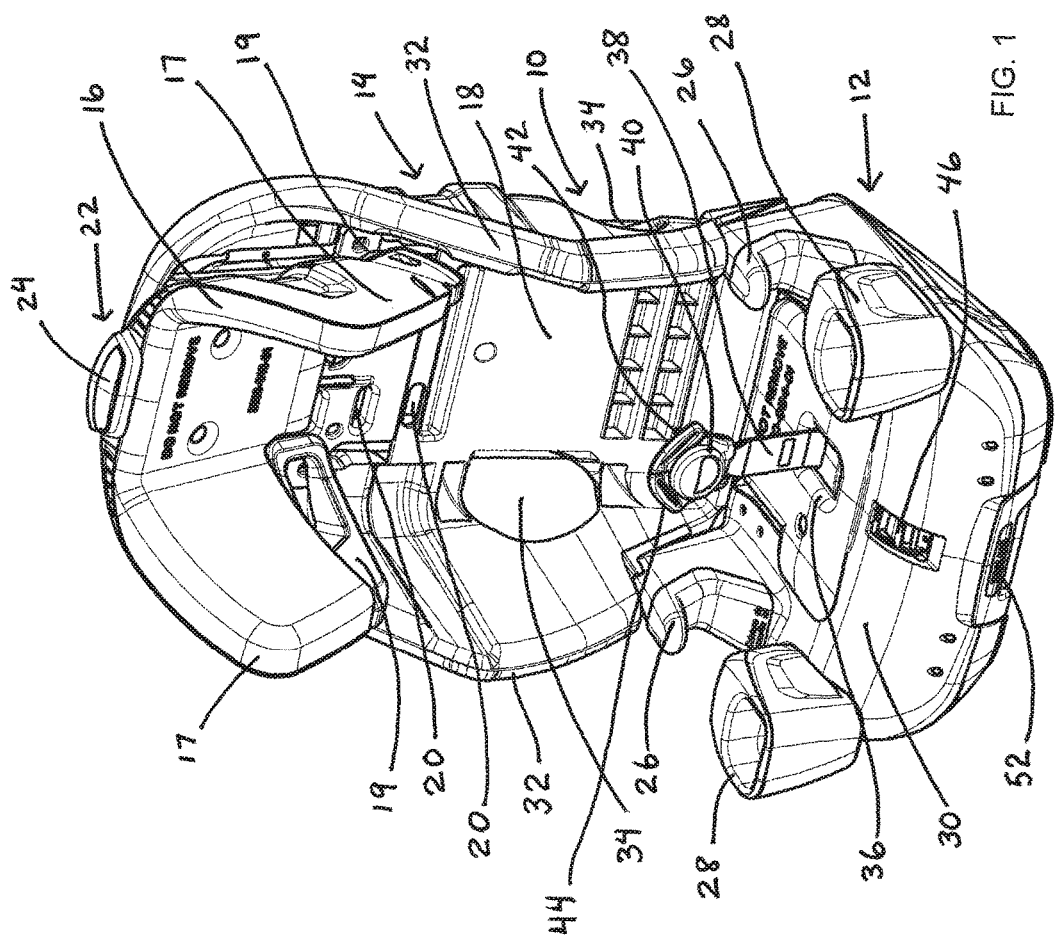
FIG. 1 is a front perspective of a harness booster car seat in accordance with aspects of the present disclosure.

While a harness booster car seat is provided that is separable into a usable backless booster and a separate backrest booster that may or may not include a harness thereon according to this disclosure may be embodied in many forms, there is shown in the drawings and will herein be described in detail one or more embodiments of a single such harness booster car seat, with the understanding that this disclosure is to be considered an exemplification of the principles disclosed herein and is not intended to be limited to merely the illustrated and discussed embodiments.

Referring to FIG. 1, an exemplary harness booster seat 10 is shown. Booster seat 10 generally includes a backless booster base 12 and a booster back 14. Backless booster base 12 and booster back 14 are separable into separately usable components.

Figure 3:
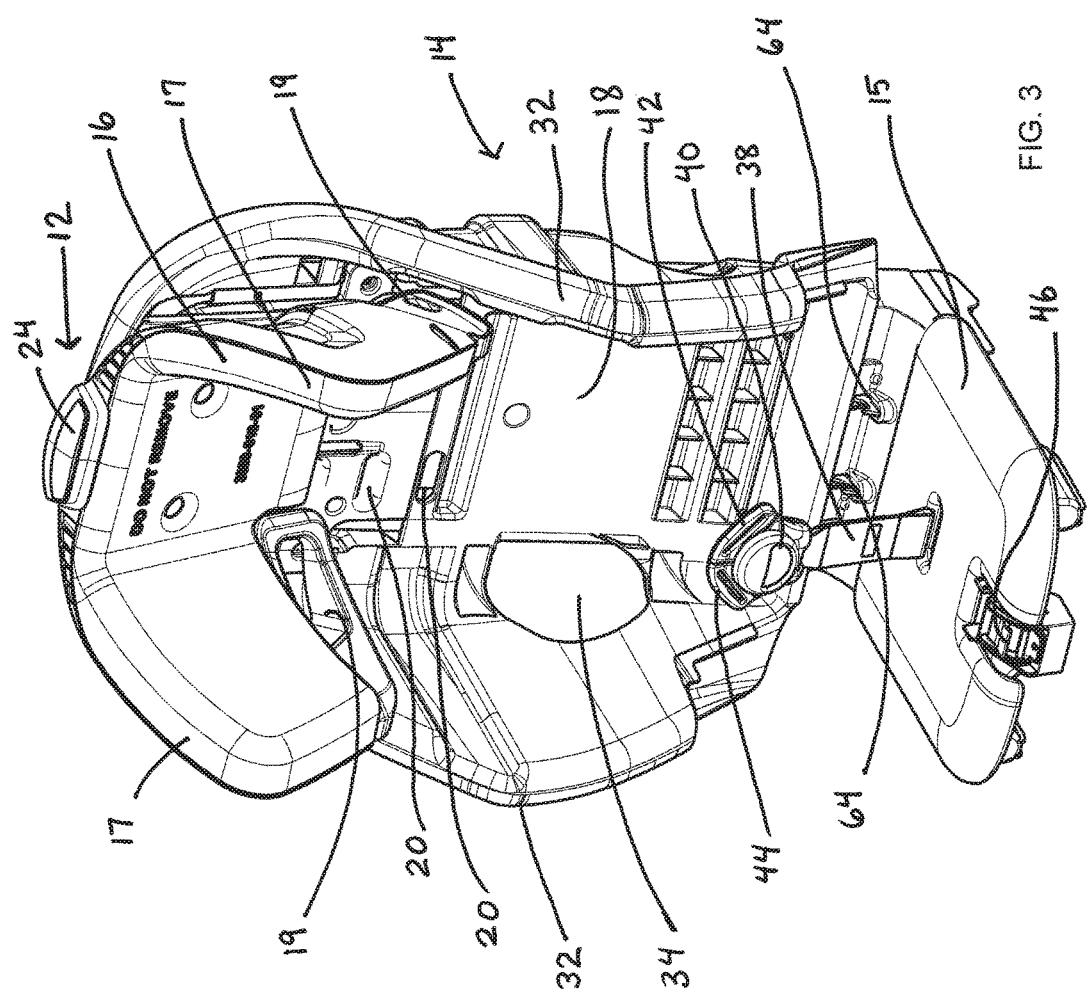
FIG. 3 is a front perspective view of the backrest/alternate seat section of the harness booster of FIG. 1.
Figure 4:
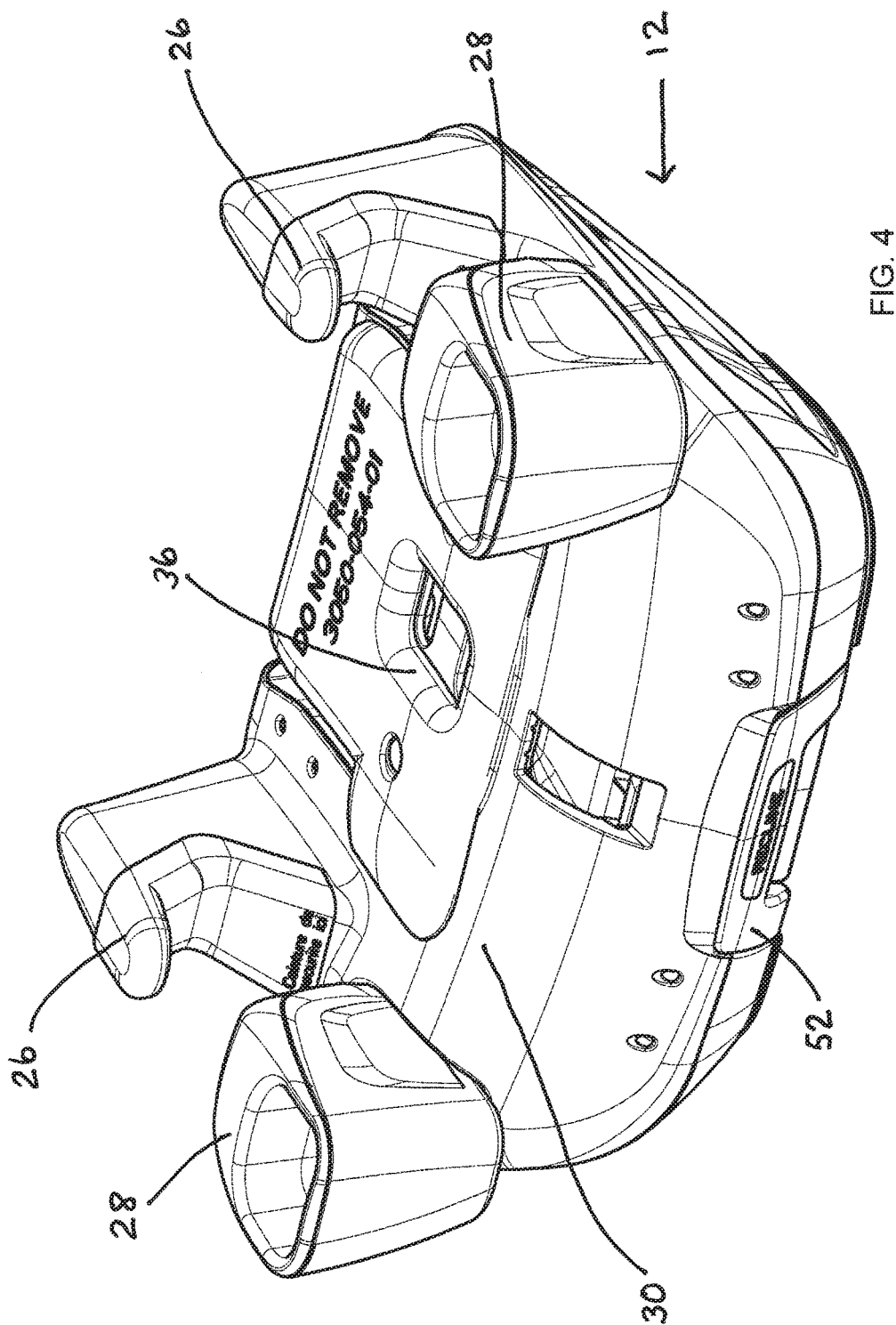
FIG. 4 is a front perspective view of the backless booster portion of the booster car seat of FIG. 1.

Booster back 14 includes head support portion 16, lumbar support portion 18, and, as best seen in FIG. 3, auxiliary seating portion 15. Head support portion 16 is adjustable and lockable relative to lumbar support portion 18 and may include side portions 17 having loops thereon 19 for receiving a car seat shoulder belt (not shown). Head support portion 16 includes an adjustment mechanism 22 including button 24 for adjusting the head support portion 16 with respect to lumbar portion 18.

Harness voids 20 are provided on the lumbar support portion 18 and upward thereof. Backless booster base 12 includes armrests 26 and cupholders 28 on either side of the seating portion 30. The lumbar support portion 18 may include side supports 32 having apertures 34 therein for receiving a car seat lap belt (not shown) therethrough. An aperture 36 may be provided in the seating portion 30 for the center strap 38 therethrough, the center strap 38 including a buckle body 40 thereon, the buckle 40 being shaped to receive and lock corresponding left and right latches (42, 44) for receiving corresponding left and right shoulder harnesses (not shown). The center strap 38 may be connected to an adjuster mechanism 46 as is known in the art for adjusting the harness, namely, the length of the center strap 38. A recline mechanism (not shown) having a recline actuator 52 is provided on the front portion of the backless booster base 12 that controls a foot (not shown) underneath the backless booster base 12 allowing for adjustment of the recline of the seat 10 as is known in the art.

Figure 2:
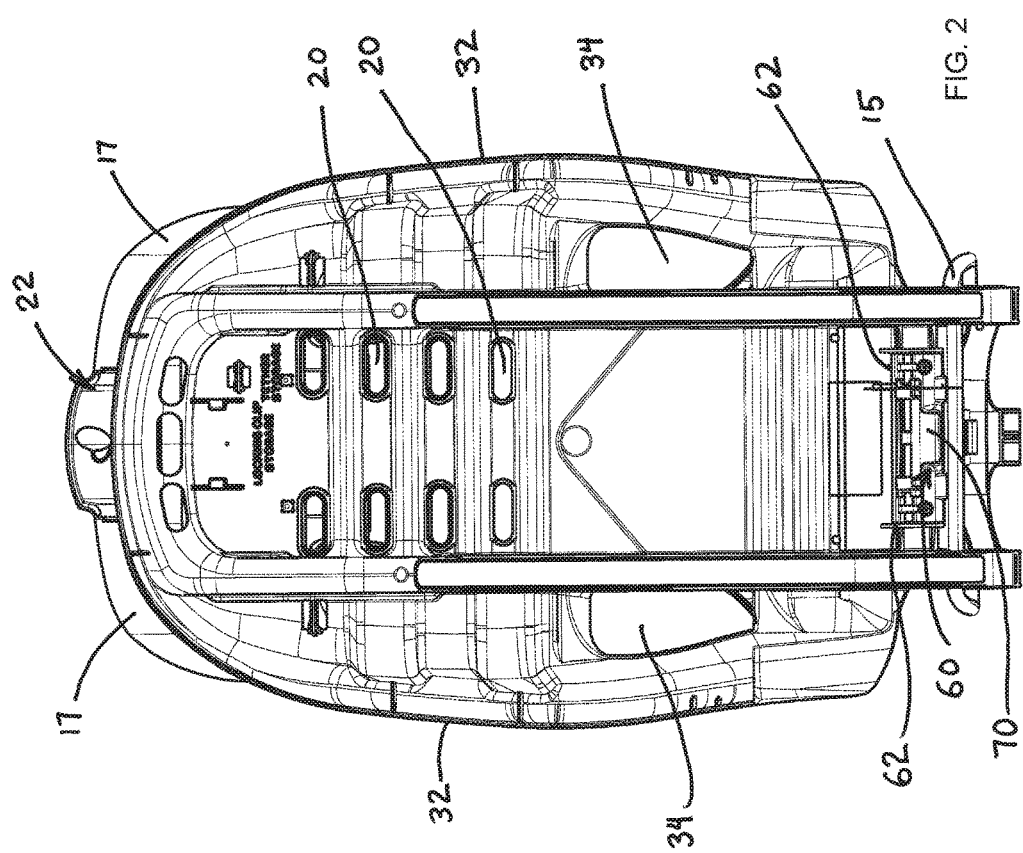
FIG. 2 is a rear elevation view of the booster of FIG. 1.
Figure 5:
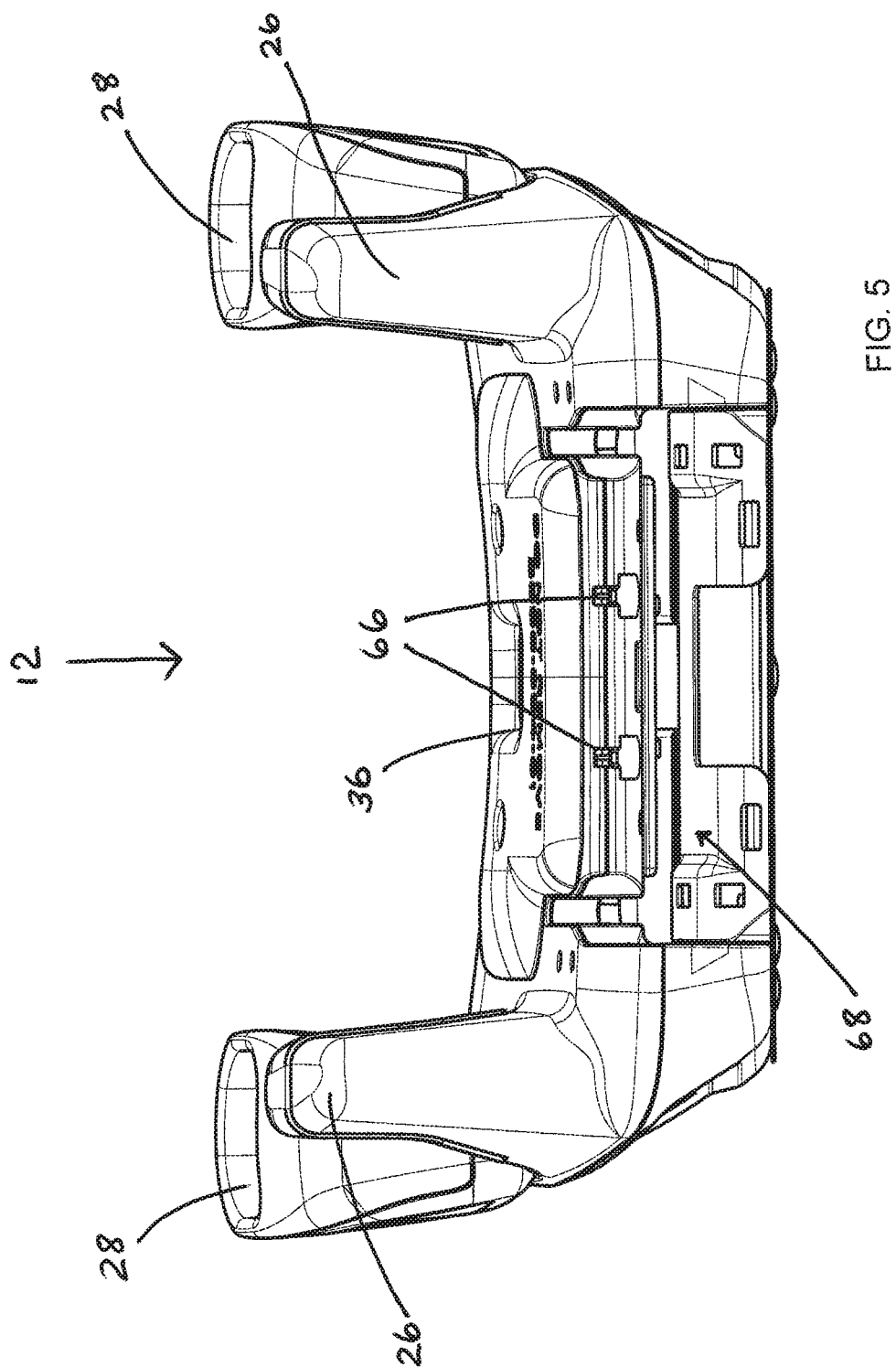
FIG. 5 is a rear elevation view of the backless booster portion shown in FIG. 4.

As best shown in FIGS. 2 and 5, a separation actuator 60 is pivotally mounted on rod 62 as are locking hooks 64. Locking hooks 64 are shaped to engage corresponding locking recesses 66 located above slot 68 on the backless booster base 12. The slot 68 is shaped to slidingly receive auxiliary seating portion 15 therein securely and fully thereby allowing the lumbar portion 18 of booster back 14 to be positioned proximal to the back of seating portion 30 at approximately 90 degree angle thereto.

A handle 70 may be provided on and depending down from the separation actuator 60 that is resiliently biased in a normally locked configuration, namely a position wherein hooks 64 are resiliently biased into engagement with locking recesses 66 by a spring (not shown). Accordingly, if separation of the backless booster base 12 from the booster back 14 is desired, a user simply pulls outwardly on handle 70 disengaging hooks 64 from recesses 66 allowing the backless booster base 12 to be slidingly separated out from the booster back 14. Following separation, booster base 12 is thus usable as a backless booster and booster back 14 may be stored for use later or used separately as its own harness booster by utilizing the auxiliary seating portion 15 and connected harness including center strap 38, buckle body 40 and corresponding left 42 and right 44 latches.

Following from the above description it should be apparent to those of ordinary skill in the art that, while the systems, methods and apparatuses herein described constitute exemplary embodiments of the present disclosure, it is understood that the disclosure is not limited to these precise systems, methods and apparatuses and that changes may be made therein without departing from the scope of the disclosure.

What is claimed is:

1. A harness booster car seat comprising:
a backrest booster having a seating surface thereon and a locking mechanism for releasably locking the backless booster thereto;
a backless booster capable of use independently from the backrest booster having a seating surface and an opening therein for slidingly receiving the seating surface of the backrest booster therein such that substantially all of the backrest booster seating surface is covered by the seating surface of the backless booster and an aperture through the seating portion thereof for receiving a center strap therethrough.

2. A harness booster car seat comprising:
a backrest booster having a seating surface thereon and a locking mechanism for releasably locking the backless booster thereto;
a backless booster capable of use independently from the backrest booster having a seating surface and an opening therein for slidingly receiving the seating surface of the backrest booster therein and an aperture through the seating portion thereof for receiving a center strap therethrough wherein said locking mechanism comprises at least one hook mounted on a locking rod on the backrest booster and said backless booster includes at least one recess for receiving said hook, and an actuator for pivoting said hook into and out of engagement with said recess.

3. A harness booster car seat comprising:
a backless booster portion having a single opening therein, a seating surface and an aperture through the seating surface thereof for receiving a center strap attached to the backrest portion therethrough;
a backrest portion including a seating surface attached thereto that is usable when the backrest portion is disconnected from the backless booster portion that slidingly connected to the backless booster portion such that substantially all of the backrest portion seating surface is covered by the seating surface of the backless booster and a locking mechanism for releasably locking the backless booster portion thereto.

4. A harness booster car seat comprising:
a backless booster portion having a single opening therein, a seating portion and an aperture through the seating portion thereof for receiving a center strap attached to the backrest portion therethrough;
a backrest portion including a seating surface attached thereto that is usable when the backrest portion is disconnected from the backless booster portion and that slidingly connected to the backless booster portion and a locking mechanism for releasably locking the backless booster portion thereto wherein said locking mechanism comprises at least one hook mounted on a locking rod on the backrest booster portion and said backless booster portion includes at least one recess for receiving said hook, and an actuator for pivoting said hook into and out of engagement with said recess.

5. A harness booster car seat comprising:
a backless booster base having an opening therein, a seating surface thereon, and an aperture through the seating portion for receiving a center strap therethrough;
a booster back comprising a head support portion, a lumbar support portion, and an auxiliary seating portion that is separately usable as a harness booster car seat;
wherein the booster back has a protruding section having the auxiliary seating portion thereon that is slidingly and lockingly received in the opening in the backless booster base such that substantially all of the booster back auxiliary seating portion is covered by the seating surface of the backless booster.

6. A harness booster car seat comprising:
- a separately usable backless booster base having an opening therein, a seating surface thereon, and an aperture through the seating portion for receiving a center strap therethrough;
- a booster back comprising a head support portion, a lumbar support portion, and an auxiliary seating portion that is separately usable as a harness booster car seat;
- wherein the booster back has a protruding section having a seating surface thereon that is slidingly and lockingly received in the opening in the backless booster base and further including a locking mechanism for releasably locking the backless booster base thereto, wherein the locking mechanism comprises at least one hook mounted on a locking rod on the booster back and said backless booster base includes at least one recess for receiving said hook, and an actuator for pivoting said hook into and out of engagement with said recess.

* * * * *